United States Patent
Wan et al.

(10) Patent No.: US 12,477,674 B2
(45) Date of Patent: Nov. 18, 2025

(54) SCROLL TYPE DISPLAY DEVICE

(71) Applicant: HKC CORPORATION LIMITED, Shenzhen (CN)

(72) Inventors: Ye Wan, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 197 days.

(21) Appl. No.: 18/457,616

(22) Filed: Aug. 29, 2023

(65) Prior Publication Data
US 2024/0306326 A1    Sep. 12, 2024

(30) Foreign Application Priority Data

Mar. 8, 2023    (CN) .......................... 202310214833.7

(51) Int. Cl.
*H05K 5/02*    (2006.01)
*H01F 7/02*    (2006.01)

(52) U.S. Cl.
CPC ............. *H05K 5/0217* (2013.01); *H01F 7/02* (2013.01)

(58) Field of Classification Search
None
See application file for complete search history.

(56) References Cited

U.S. PATENT DOCUMENTS

| | | | |
|---|---|---|---|
| 10,073,491 B2 * | 9/2018 | Choi | G06F 11/3051 |
| 11,166,388 B2 * | 11/2021 | Diboine | B60K 35/265 |
| 11,294,424 B2 * | 4/2022 | Shai | G06F 1/1652 |
| 2011/0043976 A1 * | 2/2011 | Visser | G09F 9/301 |
| | | | 361/679.01 |
| 2014/0321073 A1 * | 10/2014 | Hong | G06F 1/1652 |
| | | | 335/289 |
| 2015/0047796 A1 * | 2/2015 | Peng | G09F 11/34 |
| | | | 160/323.1 |
| 2016/0231843 A1 * | 8/2016 | Kim | G06F 3/0412 |
| 2016/0327987 A1 * | 11/2016 | Huitema | G04G 17/045 |
| 2021/0161023 A1 * | 5/2021 | Pyo | G02F 1/133305 |
| 2022/0078931 A1 | 3/2022 | Tian et al. | |

(Continued)

FOREIGN PATENT DOCUMENTS

| | | |
|---|---|---|
| CN | 105869522 A | 8/2016 |
| CN | 108648628 A | 10/2018 |
| CN | 110534024 A | 12/2019 |

(Continued)

*Primary Examiner* — Xanthia C Relford
(74) *Attorney, Agent, or Firm* — Maier & Maier, PLLC (57) ABSTRACT

A scroll type display device related to the field of displaying technologies, and the device includes: a housing, a flexible screen scroll shaft, and a flexible display screen; the housing is provided with an opening configured for extending and retracting the flexible display screen; the flexible screen scroll shaft is rotatably arranged in the housing, and the flexible screen scroll shaft is connected with the flexible display screen and configured for winding the flexible display screen; and a rear surface of the flexible display screen is provided with a plurality of magnetic support structures arranged in a longitudinal direction, and two adjacent magnetic support structures are mutually attracted. The solution provided can improve the flatness of the flexible display screen and reduce the width of the frame of the screen.

11 Claims, 7 Drawing Sheets

(56) References Cited

U.S. PATENT DOCUMENTS

2023/0225063 A1* 7/2023 Wang .................... H05K 5/0217
                                                                      361/807
2024/0310876 A1* 9/2024 Zhao ..................... G06F 1/1656

FOREIGN PATENT DOCUMENTS

| CN | 111462630 A | 7/2020 |
| CN | 112599022 A | 4/2021 |

* cited by examiner

SCROLL TYPE DISPLAY DEVICE

CROSS-REFERENCE TO RELATED APPLICATION

This application claims priority to Chinese Patent Application No. 202310214833.7, filed on Mar. 8, 2023, the content of which is incorporated herein by reference as if fully set forth herein.

TECHNICAL FIELD

The present application relates to the field of displaying technologies, and more particularly to a scroll type display device.

BACKGROUND

With the development of flexible display screen technology, the scroll type display device is more and more appearing in life of people due to the advantages such as small space occupation and being convenient to be carried.

The existing scroll type display devices mostly use the method of side support for a screen, and such supporting method will not only make the flexible display screen lack of necessary support at the middle of the flexible display screen, such that the flexible display is not prone to be flattened, but also make the flexible display screen has a wider frame due to the large structure of the side support.

SUMMARY

The present application provides a scroll type display device for improving the flatness of a flexible display screen and reducing the width of the screen frame.

In order to achieve above object, an embodiment of the present application provides a scroll type display device, and the device includes a housing, a flexible screen scroll shaft, and a flexible display screen;

the housing is provided with an opening configured for extending and retracting the flexible display screen; the flexible screen scroll shaft is rotatably arranged in the housing, and the flexible screen scroll shaft is connected with the flexible display screen and configured for winding the flexible display screen; and a rear surface of the flexible display screen is provided with a plurality of magnetic support structures arranged in a longitudinal direction, and two adjacent magnetic support structures are mutually attracted.

In a possible embodiment, each of the magnetic support structures comprises support strips arranged in a transverse direction, and opposite sides of every two adjacent support strips are respectively provided with a magnetic body.

In a possible embodiment, opposite side walls of every two adjacent support strips are respectively provided with a snap-fit structure mutually matched.

In a possible embodiment, the snap-fit structure includes: a plurality of groove structures arranged at intervals in a transverse direction located on one support strip and a plurality of protruded structures located on another support strip and configured for matching with the plurality of groove structures.

In a possible embodiment, the scroll type display device further includes: a buffer layer and a buffer layer scroll shaft; and the buffer layer scroll shaft is rotatably arranged in the housing and connected with an end of the buffer layer; wherein the buffer layer scroll shaft is arranged in parallel with the flexible screen scroll shaft, and the flexible screen scroll shaft is connected with the other end of the buffer layer; and when the buffer layer scroll shaft and the flexible screen scroll shaft are rotated in a first direction, the buffer layer is gradually wound on the buffer layer scroll shaft, and the flexible display screen is gradually extended; when the buffer layer scroll shaft and the flexible screen scroll shaft are rotated in a second direction, the buffer layer and a flexible display screen are gradually wound on the flexible screen scroll shaft, the second direction is opposite to the first direction; the buffer layer and the flexible display screen are alternately stacked and wound on the flexible screen scroll shaft.

In a possible embodiment, the buffer layer includes a first buffer layer, a second buffer layer, and a magnetic shield layer sandwiched between the first buffer layer and the second buffer layer.

In a possible embodiment, the first buffer layer and the second buffer layer are buffer films.

In a possible embodiment, a surface of at least a part of the magnetic support structure facing away from the rear surface of the flexible display screen is provided with a spinous structure, and a surface of the buffer layer facing the rear surface of the flexible display screen is provided with a recessed structure meshed with the spinous structure.

In a possible embodiment, the flexible display screen is provided with a first limiting structure and a second limiting structure, the first limiting structure is arranged adjacent to a connecting end of the flexible display screen for limiting an extension degree of the flexible display screen, and the second limiting structure is arranged adjacent to a free end of the flexible display screen for limiting a retraction degree of the flexible display screen.

In a possible embodiment, the scroll type display device further includes a drive mechanism configured for driving the flexible screen scroll shaft to rotate.

In a possible embodiment, the drive mechanism is further configured for driving the buffer layer scroll shaft to rotate.

The scroll type display device provided in the embodiment of the present application allows the display device to wind the flexible display screen by driving the flexible screen scroll shaft to rotate by providing the opening on the housing for extending and retracting of the flexible display screen. The plurality of magnetic support structures are arranged in the longitudinal direction on the rear surface of the flexible display screen, the characteristic of adjacent magnetic support structures being able to attract each other is used to provide back supporting for the flexible display screen, thus, there is no need to set up a support structure on the side of the flexible display screen, which can reduce the frame of the flexible display screen and improve the aesthetics of the flexible display screen. Compared to the side support structure, the method can improve the flatness of the flexible display screen.

DETAILED DESCRIPTION

The following describes the embodiments of the present application in conjunction with the accompanying drawings. The terms used in the embodiments of the present application are only intended to explain the specific embodiments of the present application, and are not intended to limit the present application. The following specific embodiments can be combined with each other, and the same or similar concepts or processes may not be repeated in some embodiments.

Figure 1:
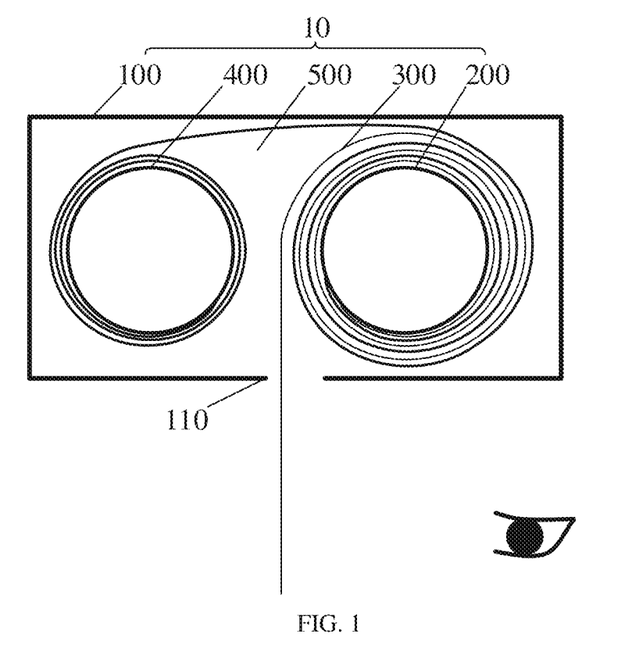
FIG. 1 is a cross-sectional structural view of a scroll type display device provided in an embodiment of the present application.
Figure 2:
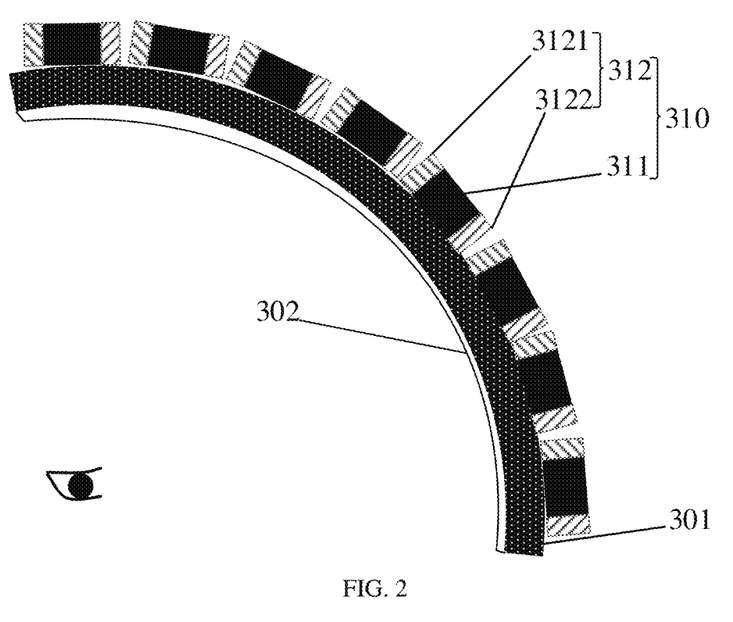
FIG. 2 is a structural schematic view of a flexible display screen provided in an embodiment of the present application.
Figure 3:
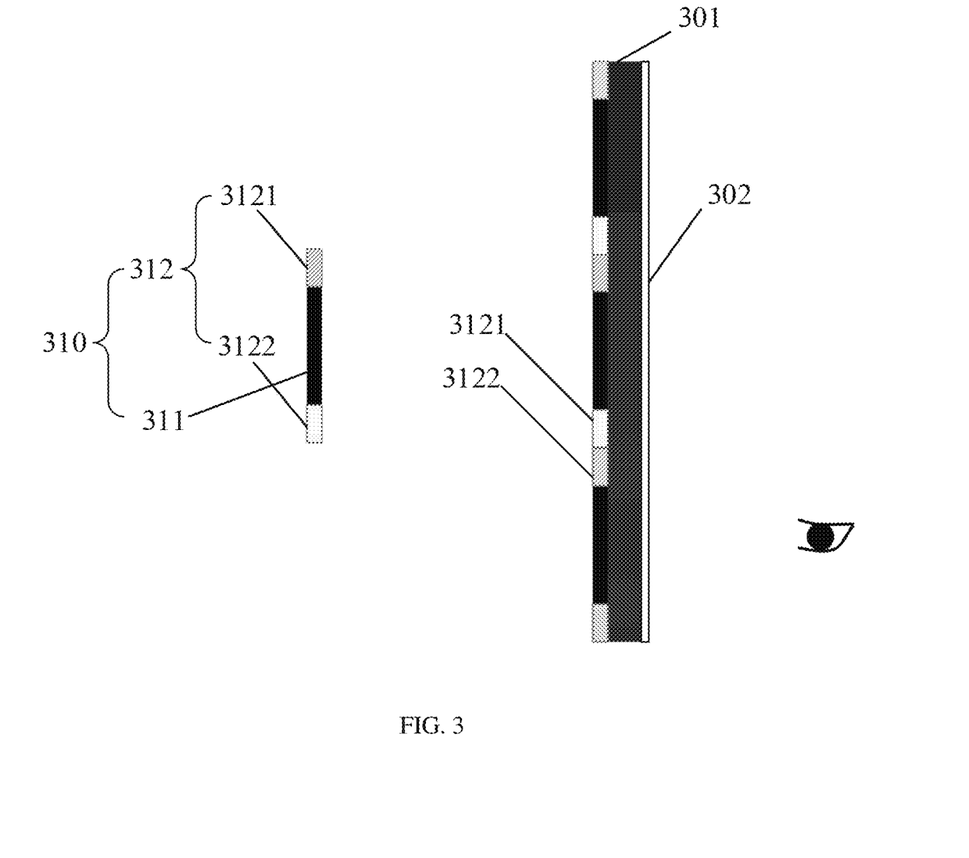
FIG. 3 is a schematic view of a magnetic support structure of a flexible display screen provided in an embodiment of the present application.

A scroll type display device, also known as a sliding out display or an expandable display, is a display device that can extend and curl (also referred to as retract in the following text) a display screen like a scroll. As shown in FIGS. 1 to 3, FIG. 1 is a cross-sectional structural view of a scroll type display device provided in an embodiment of the present application; FIG. 2 is a structural schematic view of a flexible display screen provided in an embodiment of the present application; and FIG. 3 is a schematic view of a magnetic support structure of a flexible display screen provided in an embodiment of the present application.

The display device 10 provided in the embodiment of the present application can include a housing 100, a flexible screen scroll shaft 200, and a flexible display screen 300.

The housing 100 is provided with an opening 110 configured for the flexible display screen 300 extending and retracting; the flexible screen scroll shaft 200 is rotatably arranged in the housing 100, and the flexible screen scroll shaft 200 is connected with the flexible display screen 300 and configured for winding the flexible display screen 300; and a rear surface of the flexible display screen 300 is provided with a plurality of magnetic support structures 310 arranged in a longitudinal direction, and two adjacent magnetic support structures 310 are mutually attracted.

In the embodiment, the rear surface of the flexible display screen 300 refers to a side that is away from the display picture of the flexible display screen 300, the housing 100 can further provide external protection for the flexible screen scroll shaft 200 and the flexible display screen 300 to avoid the components inside the housing 100 from bumps and other damages. By arranged the display device in the housing 100, which is also convenient to improve the portability of the display device 10

The housing 100 can be an integral component or assembled from a plurality of sub-components to facilitate operations such as maintaining the components in the housing 100.

It should be noted that in the embodiment of the present application, the housing 100 is used as an example of a boxed structure. In other embodiments, the housing 100 can also be used as other structures, such as cylindrical, spherical, shaped, etc.

In an embodiment, a length of the opening 110 is equal to a length of the flexible display screen 300, a width of the opening 110 is equal to a width of the flexible display screen 300. In order to reduce the friction caused by the extending or retracting of the opening 110 against the flexible display screen 300, the length of the opening 110 can be greater than the length of the flexible display screen 300, and the width of the opening 110 can be greater than the thickness of the flexible display screen 300.

As shown in FIG. 1, the flexible display screen 300 extends or retracts through the opening 110 of the housing 100. Considering that the flexible display screen 300 may be affected by stress or other factors during the process of extending and retracting, the stress or other factors may cause friction between the flexible display screen 300 and the opening 110, thus affecting the service life of the flexible display screen 300. In some embodiments, the friction between the flexible display screen 300 and the opening 110 can be reduced by means of providing rollers or applying lubricants at the opening 110. It is understood that other means may also be used, such as increasing the width of the opening 110 of the housing 100, which is not specifically defined in the present application.

The display device 10 further includes a drive mechanism electrically connected with the display device 10, and the drive mechanism is used to drive the flexible screen scroll shaft 200 to rotate, thus driving the flexible display screen 300 to extend and retract. For example, the drive mechanism may include a stepper motor, which drives the flexible screen scroll shaft 200 to rotate.

For example, the inner wall of the housing 100 corresponding to two ends of the flexible screen scroll shaft 200 is provided with a first rotating shaft, and the flexible screen scroll shaft 200 is rotatably connected with the housing 100 through the first rotating shaft.

The first rotating shaft is detachable, so that the flexible screen scroll shaft 200 can be removed without damaging the display device 10.

For the convenience of expression, in the following, a state of flexible display screen 300 completely retracted within the housing 100 is called curled state (also called retracted state), a state of flexible display screen 300 completely extended out of the housing 100 is called extended state, and a state of flexible display screen 300 partially extended out of the housing 100 is called semi-extended state (also called semi-retracted state).

In the process of winding up or extending out of the flexible display screen 300, there can be a certain gap between the flexible screen scroll shaft 200 and the inner wall of the housing 100 when rotating, so as to reduce the friction between the flexible display screen 300 and the inner wall of the housing 100, and to improve the service life of the flexible display screen 300.

As shown in FIG. 2 and FIG. 3, the flexible display screen 300 can include a flexible substrate 301 and display component 302 prepared on the flexible substrate 301, the display component 302 can be an OLED flexible self-luminous display screen or other flexible display screens, such as a microLED array flexible display screen and a flexible electronic paper screen, etc. the present application embodiment does not specifically limit the types of flexible display screens.

The two ends of the flexible display screen 300 are respectively referred as the connecting end and the free end, the connecting end refers to the end of the flexible display screen 300 connected with the flexible screen scroll shaft 200, the connecting end is fixed on the flexible screen scroll shaft 200, the fixing method can be glued, snap-fitted, screw or fixing by providing a fixing groove on the flexible screen scroll shaft 200 and embedding the flexible display screen 300 into the fixing groove. The free end refers to the end opposite to the connecting end. The free end can extend out of the housing 100 or retract to a predetermined position within the housing 100.

In some embodiments of the present application, the display device 10 further includes a control mechanism, the control mechanism is used to control the flexible display screen 300 to display. Exemplify, the control mechanism can control a area of the flexible display screen 300 to display according to area of the flexible display screen 300 extending out of the housing 100. For example, when the drive mechanism causes the length of the flexible display screen 300 that extends out of the housing 100 to account for 50% of the maximum extension length of the flexible display screen 300 according to user instructions, the control mechanism can adjust the display ratio and visible area of the flexible display screen 300 according to the extension length of the flexible display screen 300, so that the display picture can be matched with the visible area.

As shown in FIG. 2 and FIG. 3, the rear surface of flexible display screen 300 is provided with a plurality of magnetic support structures 310 arranged in a longitudinal direction, the two adjacent magnetic support structures 310 can be attracted to each other, so that the magnetic force (or interaction force) between the magnetic support structures 310 can be used when the flexible display screen 300 is in the extended or semi-extended state, to provides back support for the flexible display screen 300.

In a specific embodiment, the plurality of magnetic support structures 310 can cover all of the rear surface of the flexible display screen 300, and can also cover part of the rear surface of the flexible display screen 300.

Figure 4:
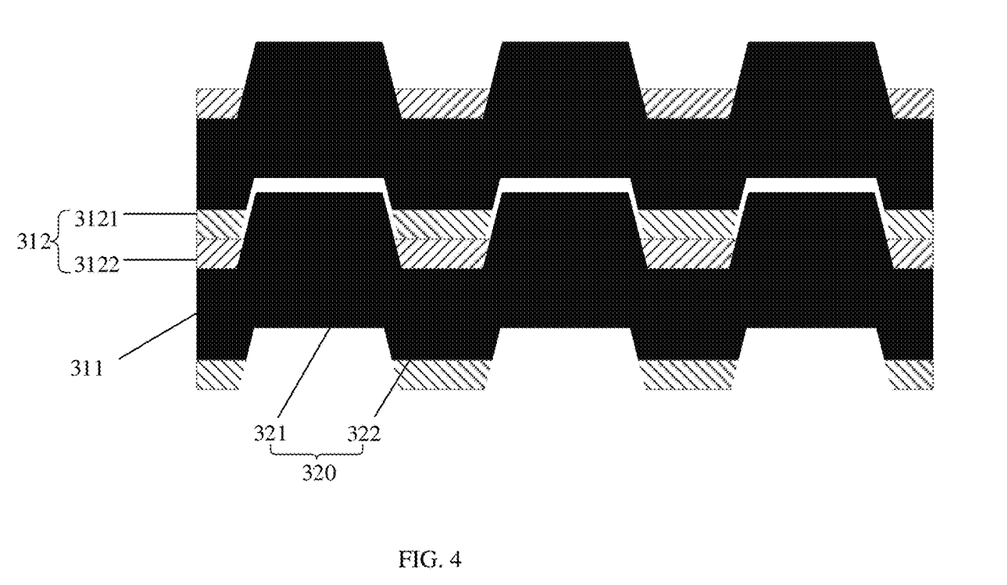
FIG. 4 is a schematic view of a snap-fit structure of a flexible display screen provided in an embodiment of the present application.

In a possible embodiment of the present application, each magnetic support structure 310 includes a support strip 311 arranged in a transverse direction, the support strips 311 can be arranged on a flexible substrate 301 by gluing, snap-fitting, and other fixing methods, opposite sides of every two adjacent support strips 311 are respectively provided with a magnetic body 312, and the magnetic body 312 is glued to the support strip 311 and/or the flexible substrate 301, or fixed to the support strip 311 and/or the flexible substrate 301 by providing a snap-fit structure, etc. As shown in FIG. 3 and FIG. 4, a first magnetic body 3121 and a second magnetic body 3122 are respectively arranged at two ends of the support strip 311. When the two adjacent support strips 311 are approaching, the first magnetic body 3121 on one support strip 311 can be attracted with the second magnetic body 3122 on another support strip 311.

It can be understood that, for the topmost of the magnetic support structure 310, the upper side of the support strip 311 can be provided with the first magnetic body 3121, or not be provided with the first magnetic body 3121; For the lowest magnetic support structure 310, the lower end of the support strip 311 can be provided with the second magnetic body 3122 or not be provided with the second magnetic body 3122.

When the flexible display screen 300 is extended outward through the opening 110 of the housing 100, the magnetic attraction between the magnetic bodies arranged on the opposite sides of the two adjacent support strips 311, such as the magnetic attraction between the first magnetic body 3121 and the second magnetic body 3122, such that the flexible display screen 300 is extended and flatten under the magnetic force to the rear portion of the magnetic force, therefore, the deformation of, the flexible display screen 300 during extending is reduced, and the picture can be better displayed.

In the embodiment, the material of the support strip 311 can be a stainless steel, an aluminum or an ABS plastic, or a hard composite material, and the material of the magnetic body 312 can be a neodymium magnet or other magnetic body with strong remanence, which is not specially limited in the present application.

Considering the stiffer material of the support strip 311, a flexible layer is further arranged between the flexible substrate 301 and the support strips 311 to reduce the damage of the support strips 311 to the flexible substrate 301.

In practical application, the extending and retracting direction of flexible display screen 300 is not only suitable for a vertical expansion scenario, but also suitable for a horizontal expansion scenario and other directions. In order to improve the applicability and practicability of display device 10, the flexible display screen 300 can be limited in the non-preset bending direction, and opposite side walls of every two adjacent support strips are respectively provided with a snap-fit structure mutually matched.

In an example embodiment of the present application, when the flexible display screen 300 is extended and retracted in the horizontal direction, due to the influence of gravity factors, the support strips 311 will offset in the gravity direction, and resulting in deformation of the flexible display screen 300, therefore, the display effect is affected. The snap-fit structures 320 arranged at the rear portion of the flexible display screen 300, so that when the flexible display screen 300 is deformed in the gravity direction, the deformation of the flexible display screen 300 is limited by the adjacent snap-fit structures 320 to achieve the limitation.

As shown in FIG. 4, the mutually matched snap-fit structures 320 arranged on two adjacent support strips 311 include: a plurality of groove structures 321 arranged at intervals in a transverse direction located on one support strip 311 and a plurality of protruded structures 322 located on another support strip 311 and configured for matching with the plurality of groove structures 321.

In a specific embodiment, taking any two adjacent support strips 311 as an example, for the convenience of expression, one of the two adjacent support strips 311 is a first support strip, and the other one of the two adjacent support strips 311 is a second support strip. In some embodiments, the groove structures 321 can be provided on one side of the first support strip, and the protruded structures 322 can be provided on the other side of the first support strip. The snap-fit structure arranged on the second support strip is similar to that on the first support strip.

In other embodiments, two sides of the first support strip are respectively provided with the groove structures 321, and two sides of the second support strip adjacent to the first support strip are respectively provided with the protruded structures 322; the groove structures 321 located on two sides of the first support strip are arranged opposite to each other, or staggered. Similarly, the protruded structures 322 located on two sides of the second support strip are arranged opposite to each other, or staggered.

In an embodiment of the present application, the magnetic body 312 is provided on the opposite side of groove structures 321 and protruded structures 322. In other embodiments of the present application, the magnetic body 312 is not provided on the opposite side of the groove structures 321 and the protruded structures 322.

It can be understood that the shapes of the groove structures 321 and the protruded structures 322 are not limited to the trapezoid shown in FIG. 4. In the actual application, the shapes of the groove structures 321 and the protruded structures 322 can also be changed to other shapes, such as triangle, semi-circle, shaped, etc.

In a possible embodiment, the snap-fit structure 320 can also be provided with a weak snap-fit structure having elasticity to improve the accuracy of snap-fitting, so as to better support the flexible display screen 300 after the snap-fit structure 320 is snap-fitted; and it is convenient to separate when the snap-fit structure needs to be unfastened.

When the drive mechanism drives the flexible screen scroll shaft 200 to wind the flexible display screen 300, the flexible screen scroll shaft 200 drives the connecting end of the flexible display screen 300 to generate tension force, so that the flexible display screen 300 curls on the flexible screen scroll shaft 200. During the winding process or when the flexible display screen 300 is in the curled state, the superposition between the layers of the flexible display screen 300 can be squeezed due to the tension force and the gravity, which will cause damage to the flexible display screen 300.

Figure 5:
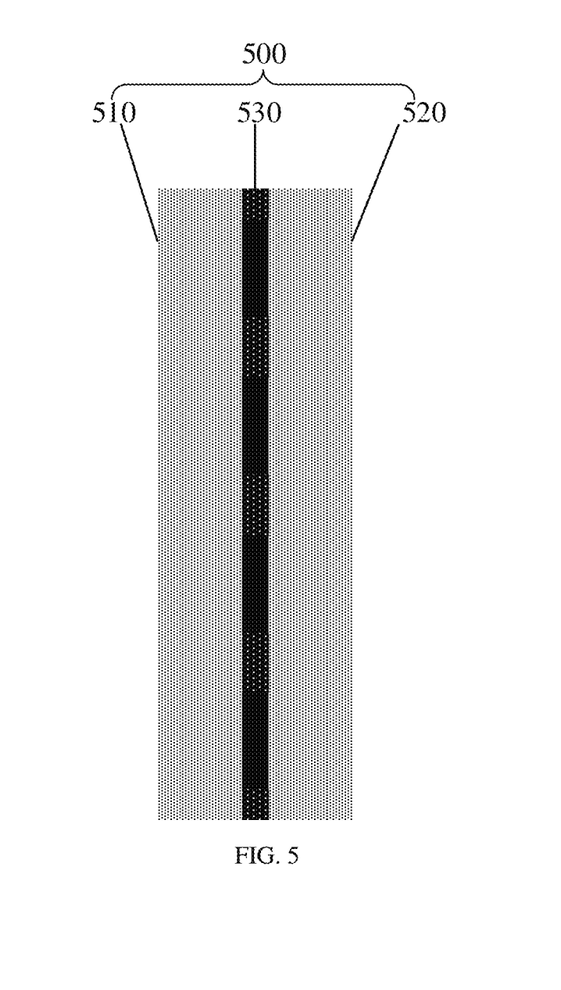
FIG. 5 is a structural schematic view of a buffer layer provided in an embodiment of the present application.

In order to avoid above situation, in a possible embodiment of the present application, the scroll type display device further includes a buffer layer scroll shaft 400 and a buffer layer 500, as shown in FIGS. 1 and 5, the buffer layer scroll shaft 400 is rotatably arranged in the housing 100 and is connected to one end of the buffer layer 500. The two ends of the buffer layer scroll shaft 400 are connected with the housing 100 through the second rotating shaft. The second rotating shaft is used to support the buffer layer scroll shaft 400, which can not only drive the buffer layer scroll shaft 400 to rotate, but also avoid friction between the buffer layer scroll shaft 400 and the inner wall of the housing 100. The buffer layer scroll shaft 400 is arranged in parallel with the flexible screen scroll shaft 200, and the flexible screen scroll shaft 200 is connected to the other end of the buffer layer 500.

For the convenience of description, the end connecting the buffer layer 500 and the buffer layer scroll shaft 400 is called a first buffer end, and the end connecting the buffer layer and the flexible screen scroll shaft 200 is called a second buffer end.

When the buffer layer scroll shaft 400 and the flexible screen scroll shaft 200 are rotated in a first direction, the buffer layer is gradually wound on the buffer layer scroll shaft 400, and the flexible display screen is gradually extended. Taking the position relationship between the buffer layer scroll shaft 400 and the flexible screen scroll shaft 200 in FIG. 1 as an example, the first direction is counterclockwise. When the flexible display screen 300 is in the curled state or the semi-extended state, the flexible display screen 300 gradually extends with the counterclockwise rotation of the flexible screen scroll shaft 200 and the buffer layer scroll shaft 400. The buffer layer scroll shaft 400 drives the first buffer end to move, and the buffer layer 500 of the flexible screen scroll shaft 200 is gradually wound on the buffer layer scroll shaft 400.

When the buffer layer scroll shaft 400 and the flexible screen scroll shaft 200 are rotated in a second direction, the buffer layer 500 and the flexible display screen 300 are gradually wound on the flexible screen scroll shaft 200, the second direction is opposite to the first direction, so that the buffer layer 500 and the flexible display screen 300 winding on the flexible screen scroll shaft 200 are alternately stacked. Continue to take the position relationship between the buffer layer scroll shaft 400 and the flexible screen scroll shaft 200 in FIG. 1 as an example, the second direction is clockwise.

When the flexible display screen 300 is in the extended state, and the buffer layer scroll shaft 400 and the flexible screen scroll shaft 200 both rotate clockwise, the buffer layer 500 wound on the buffer layer scroll shaft 400 is gradually wound on the flexible screen scroll shaft 200 as the flexible screen scroll shaft 200 driving the second buffer end, and the flexible screen scroll shaft 200 drives the connecting end of the flexible display screen 300 to rotate to gradually wind the originally extended flexible display screen 300 onto the flexible screen scroll shaft 200, so as to wind the flexible display screen 300 and the buffer layer 500 together on the flexible screen scroll shaft 200, to form a structure of alternating layers.

In the embodiment, the flexible display screen 300 or the buffer layer 500 is in contract with the outer wall of the flexible screen scroll shaft 200 according to the actual needs; when the flexible display screen 300 is in contract with the outer wall of the flexible screen scroll shaft 200, flexible materials can be arranged on the outer wall of the flexible screen scroll shaft 200 to provide flexible protection for the flexible display screen 300 wound on the flexible screen scroll shaft 200.

Figure 6:
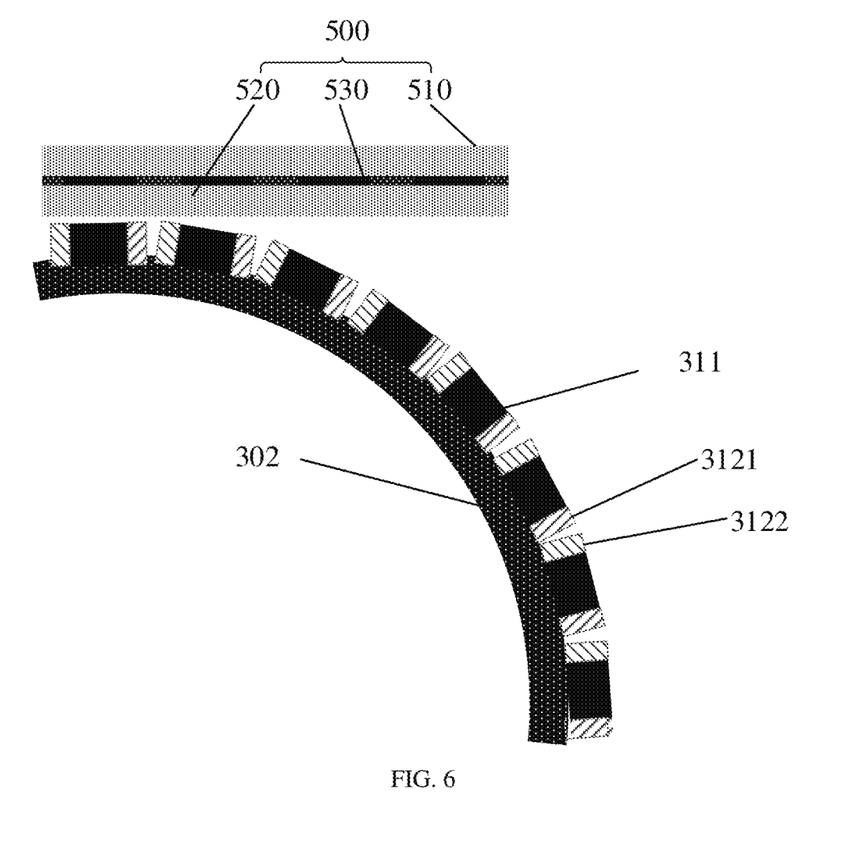
FIG. 6 is a schematic view of a magnetic field shielding structure of a flexible display screen provided in an embodiment of the present application.

As shown in FIG. 5 and FIG. 6, the buffer layer 500 includes a first buffer layer 510, a second buffer layer 520 and a magnetic shield layer 530 sandwiched between the first buffer layer 510 and the second buffer layer 520, the magnetic shield layer 530 can shield the magnetic interference between the flexible display screen 300 of the adjacent layer of the winding on the flexible screen scroll shaft 200. Thus, the adsorption/repulsion of the magnetic body across layers is reduced and the remanent magnetic life of the magnetic body 312 is prolonged.

In a possible embodiment, the first buffer layer 510 and the second buffer layer 520 are buffer films, and the magnetic shield layer 530 can be fixed directly between the first buffer layer 510 and the second buffer layer 520 by means of gluing, or the first buffer layer 510, the second buffer layer 520 and the magnetic shield layer 530 are bonded by PET double-sided adhesive film sheets provided therebetween to increase the adhesion.

In the embodiment of the present application, the materials of the first buffer layer 510 and the second buffer layer 520 are soft foamed material or thin film material. The foamed material can include PE, TPU, EPE and PVC, etc. Compared with the foamed material, the first buffer layer 510 and the second buffer layer 520 are made of thin film material, and the thickness of the buffer layer 500 is thinner. For example, in an embodiment, the first buffer layer 510 and the second buffer layer 520 are made of EPE material, the corresponding thickness of the buffer layer 500 is 1.9 mm; in other embodiments, the first buffer layer 510 and the second buffer layer 520 are made of thin film material, and the corresponding thickness of the buffer layer 500 is 1.2 mm. The magnetic shield layer 530 can be made of a soft iron, a silicon steel, a Permo alloy, an iron nickel alloy, an amorphous alloy and other materials with high permeability. In some embodiments of the present application, the thickness of buffer layer 500 is ranged from 0.2 mm to 6 mm.

In some embodiments, the materials of the first buffer layer 510 and the second buffer layer 520 are foamed material or thin film material. In some embodiments, the first buffer layer 510 is made of foamed material and the second buffer layer 520 is made of thin film material, or the first buffer layer 510 is made of thin film and the second buffer layer 520 is made of foamed material.

In the embodiment, the thickness of the first buffer layer 510 and the thickness of the second buffer layer 520 are the same or different, the thicknesses and the selection of materials of the first buffer layer 510 and the second buffer layer 520 can be arranged according to the actual needs, which is not specially limited in the present application.

In the embodiment, the buffer layer 500 and the flexible display screen 300 are arranged separately, which can reduce the thickness of flexible display screen 300, thus improving user experience.

Figure 7:
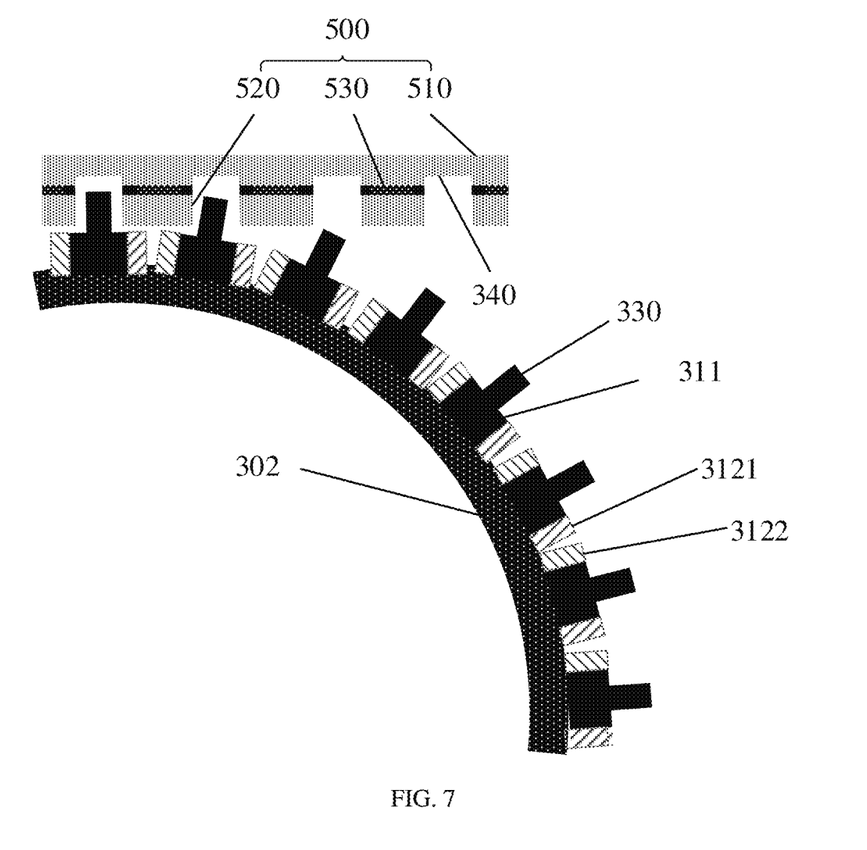
FIG. 7 is a schematic view of a magnetic field shielding structure with a spinous structure provided in an embodiment of the present application.

As shown in FIG. 7, in order to prevent misalignment between the buffer layer 500 and the flexible display screen 300 from affecting the magnetic shielding effect of magnetic shield layer 530, in some embodiments of the present application, a spinous structure 330 is arranged on a surface (hereinafter referred to as a upper surface) of magnetic support structure 310 facing away from the rear surface of the flexible display screen 300; and a recessed structure 340 meshing with the spinous structure 330 is arranged on a surface (hereinafter referred to as a lower surface) of the buffer layer 500 facing the rear surface of the flexible display screen 300, thus a magnetic field shielding structure is formed.

In a specific embodiment, one or more spinous structures 330 is arranged on the upper surface of all or part of the magnetic support structure 310. For example, a plurality of spinous structures 330 arranged at equal intervals along a transverse direction are arranged on each support strip 311.

In the embodiment, the spinous structures 330 are integrated with the support strip 311, or the spinous structures 330 and the support strip 311 are fixed together by means of snap-fitting, gluing, and locking, etc.; the spinous structure 330 is a cylindrical, a square column, a triangular section or trapezoidal column, etc. The height of the spinous structure 330 is less than the thickness of the buffer layer 500. The material of the spinous structure 330 is the same as that of the support strip 311, such as a teflon-plated plastic, a metal tooth block and other friction resistant materials.

Accordingly, the layout and shape of the recessed structure arranged on the lower surface of the buffer layer 500 are matched with that of the spinous structure 330 arranged on each support strip 311. When the flexible display screen 300 and the buffer layer 500 are wound on the flexible screen scroll shaft 200, the top of the spinous structure 330 is abutted against the bottom of the recessed structure 340. The number and positions of the spinous structures 330 and the recessed structures 340 are determined according to actual needs.

It can be understood that in actual practice, the present application is also possible to increase the thickness of the support strip 311 to act as the spinous structure 330 while maintaining the position of the magnetic body unchanged.

In some embodiments of the present application, stop structures extending in a radial direction can be provided at two ends of the flexible screen scroll shaft 200 to limit the position of the flexible display screen on the flexible screen scroll shaft 200. Similarly, stop structures extending in a radial direction can also be provided at two ends of the buffer layer scroll shaft 400, so as to reduce the misbuckle or bad engagement between the spinous structures 330 and the recessed structures 340.

In some embodiments of the present application, a first limiting structure and a second limiting structure are arranged on the flexible display screen 300, where the first limiting structure is arranged adjacent to the connecting end of the flexible display screen 300 to limit the extension degree of the flexible display screen 300, and the second limiting structure is arranged adjacent to the free end of the flexible display screen 300 to limit the retraction degree of the flexible display screen 300, so as to improve the service life and user experience of the display device.

In the embodiment, the first limiting structure is arranged adjacent to the connecting end of the flexible display screen 300, after the flexible display screen 300 extends reaching the limit to the housing 100, the flexible display screen 300 stops extending through the limiting effect of the first limiting structure. For example, the first limiting structure can be realized by extending the length of one of the support strips 311 (hereinafter referred to as a first support strip). The length of the first support strip is longer than the length of the opening 110 of the housing 100. During the extending of the flexible display screen 300, when the first support strip reaches the opening 110 of the housing 100, then the flexible display screen 300 has been extended to a limit position, and the drive mechanism then stops driving the flexible screen scroll shaft 200 to rotate after the load change has been sensed, and the extending process is completed. The first limiting structure can also be realized by increasing the height of a part of the spinous structure 330 (hereinafter referred to as a first spinous structure). The superimposed height of the magnetic support structure 310 and the first spinous structure is greater than the width of the opening 110 of the housing 100. Thus, the flexible display screen 300 stops extending due to the limitation of the first spinous structure at the opening 110 after extending a preset length.

In the embodiment, the second limiting structure is arranged adjacent to the free end of the flexible display screen 300, after the flexible display screen 300 retracts reaching the limit into the housing 100, the flexible display screen 300 stops retracting through the limiting effect of the second limiting structure. For example, the second limiting structure can be realized by extending the length of one of the support strips 311 (hereinafter referred to as second support strip). The length of the second support strip is longer than the length of the opening 110 of the housing 100. During the retracting of the flexible display screen 300, when the first support strip retracts reaching the opening 110 of the housing 100, then the flexible display screen 300 has been retracted to a limit position, and the flexible screen scroll shaft 200 is stopped to rotate, and the retracting process is completed.

The second limiting structure can also be realized by increasing the height of a part of the spinous structure 330 (hereinafter referred to as a second spinous structure), so that the user cannot see the second limiting structure on the front of the display device, thus improving the aesthetics of the display device.

In the specific embodiment, the superimposed height of the magnetic support structure 310 and the spinous structure 330 is greater than the width of the opening 110 of the housing 100. During the retracting process of the flexible display screen 300, when the spinous structure 330 is blocked at the opening 110, then the flexible display screen 300 has reached the retracting limit and can stop retracting at this time.

In order to prevent the flexible display screen 300 from excessive extension or retraction, in addition to providing the limiting structure, there are other ways to realize the limit of the flexible display screen 300.

For example, in some embodiments, the drive structure further includes a detection component which may be used to detect the rotational parameters of the stepper motor as it rotates. For example, the detection component calculates the total length of extending or retracting by detecting the angular velocity and time of the stepper motor rotating in the rotation direction, so that after the total length reaches a preset extending or retracting length, a signal is sent to the drive mechanism, and the drive mechanism instructs the stepper motor to stop rotating, thereby avoiding excessive extension and retraction of the flexible display screen 300, where the preset extending or retracting length can be arranged by the drive mechanism or by the user.

In other embodiments, the distance between the free end of the flexible display screen 300 and the housing 100 can also be detected by providing a distance sensor, such as an infrared sensor, at the free end. When the extension or retraction of the flexible display screen 300 reaches a preset threshold, the drive mechanism indicates the stepper motor to stop rotating.

In the embodiment of the present application, for the area in the flexible display screen 300 that does not extend out of the housing 100, the display component 302 may not be arranged on the flexible substrate 301 to reduce costs.

When the drive mechanism drives the flexible display screen 300 to extend, the drive mechanism simultaneously drives the flexible screen scroll shaft 200 and the buffer layer scroll shaft 400 to rotate in the same direction according to the same angular displacement, so as to reduce the extending anomaly caused by the inconsistent rotation speeds. In the embodiment, two stepper motors are used to control the flexible screen scroll shaft 200 and the buffer layer scroll shaft 400 respectively to rotate. Alternatively, one stepper motor is used to drive both the flexible screen scroll shaft 200 and the buffer scroll shaft 400 to rotate. When the flexible display screen 300 is retracted, in an embodiment, only the flexible screen scroll shaft 200 is driven to rotate, so as to use the second buffer end to drive the buffer layer scroll shaft 400 to rotate and retract; in other embodiments, both the flexible screen scroll shaft 200 and the buffer layer scroll shaft 400 are driven to rotate in the same direction according to the same angular displacement.

The display device provided by the embodiments of the present application, the support structure is arranged at the rear portion of the flexible display screen, which can not only provide support for the flexible display screen during use to improve the flatness of the flexible display screen, but also reduce the width of the frame without providing the support structure on the frame, thus the appearance of the flexible display screen is improved, and narrow frame or even frameless of the flexible display screen can be realized to improve the screen ratio of display device.

It should be understood that in the description of the present application and the accompanying claims, the terms "including", "comprising", "having" and any variation thereof, which are intended to cover non-exclusive inclusion, mean "including but not limited to" unless otherwise specifically emphasized.

In the description of the present application, unless otherwise stated, "/" indicates that the object of the preceding and subsequent association is an "or" relationship. For example, A/B can mean either A or B; "and/or" in the present application is used to describe the association relationship of the associated object, indicating that there can be three kinds of relationships. For example, A and/or B can indicate that A exists alone, A and B exist simultaneously, and B exists alone, where A and B can be singular or plural.

In the description of the present application, "a plurality of" means two or more than two unless otherwise stated. "At least one of the following", or similar expressions thereof, means any combination of these terms, including any combination of singular or plural terms.

In addition, in the description of the present application, it needs to be understood that, directions or location relationships indicated by terms such as "longitudinal", "transverse", "up", "down", "front", "rear", "left", "right", "vertical", "horizontal", "perpendicular", "top", "bottom", "inside", "outside", "axis", "radial", and "circumferential", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In the present application, unless otherwise expressly specified and qualified, the terms "connection", "connecting" etc. should be generally interpreted, such as mechanical connection or electrical connection. It may be directly connected or indirectly connected through an intermediary, it may be the connection within two components or the interaction between two components. Unless otherwise expressly defined, the specific meaning of the above terms in the present application may be understood by those skilled in the art according to the specific conditions.

Furthermore, in the description of the present application and the annexed claims, the terms "first", "second", etc. are used to distinguish similar objects and are not necessarily used to describe a particular order or precedence, nor are they to be understood as indicating or implying relative importance or as implicitly indicating the quantity of the technical characteristics indicated. It should be understood that the data thus used are interchangeable, where appropriate, so that the embodiments described here can be implemented in an order other than that illustrated or described here; the features qualified as "first" or "second" may explicitly or implicitly include at least one of the features.

In the embodiment of the present application, the words "exemplary" or "for example" are used to mean to exemplify or illustrate. Any embodiments or designs described as "exemplary" or "for example" in the embodiment of the present application shall not be construed as preferable or superior to other embodiments or designs. Specifically, the use of words such as "exemplary" or "for example" is intended to present related concepts in a specific way.

References to "one embodiment" or "some embodiments", etc., as described in the description of the present application mean the inclusion in one or more embodiments of the present application of specific features, structures or characteristics combined with the description of such embodiments. Thus, the statements "in one embodiment", "in some embodiments", "in some other embodiments", "in some further embodiments", etc. which appear in differences in the specification do not necessarily all refer to the same embodiments but mean "one or more but not all embodiments" unless otherwise specifically emphasized.

Finally, it should be noted that the above embodiments are intended only to illustrate the technical solution of the present application and not to limit the present application; although the detailed description of the present application by reference to the foregoing embodiments, those skilled in the art should understand that it may modify the technical solution recorded in the foregoing embodiments, or make equivalent replacement of some or all of the technical features thereof. Such modification or replacement shall not remove the essence of the corresponding technical solution from the scope of the technical solution of each embodiment of the present application.

What is claimed is:

1. A scroll type display device, comprising:
   a housing;
   a flexible screen scroll shaft; and
   a flexible display screen;
   wherein the housing is provided with an opening configured for extending and retracting the flexible display screen;
   the flexible screen scroll shaft is rotatably arranged in the housing, and the flexible screen scroll shaft is connected with the flexible display screen and configured for winding the flexible display screen; and
   a rear surface of the flexible display screen is provided with a plurality of magnetic support structures arranged in a longitudinal direction, and two adjacent magnetic support structures are mutually attracted;
   wherein each of the magnetic support structures comprises support strips arranged in a transverse direction, and opposite sides of every two adjacent support strips are respectively provided with a magnetic body.

2. The scroll type display device according to claim 1, wherein opposite side walls of every two adjacent support strips are respectively provided with a snap-fit structure mutually matched.

3. The scroll type display device according to claim 2, wherein the snap-fit structure comprises: a plurality of groove structures arranged at intervals in the transverse direction located on one support strip and a plurality of protruded structures located on another support strip and configured for matching with the plurality of groove structures.

4. The scroll type display device according to claim 1, wherein the scroll type display device further comprises:
   a buffer layer;
   a buffer layer scroll shaft rotatably arranged in the housing and connected with an end of the buffer layer; wherein the buffer layer scroll shaft is arranged in parallel with the flexible screen scroll shaft, and the flexible screen scroll shaft is connected with the other end of the buffer layer; and
   when the buffer layer scroll shaft and the flexible screen scroll shaft are rotated in a first direction, the buffer layer is gradually wound on the buffer layer scroll shaft, and the flexible display screen is gradually extended; when the buffer layer scroll shaft and the flexible screen scroll shaft are rotated in a second direction, the buffer layer and a flexible display screen are gradually wound on the flexible screen scroll shaft, the second direction is opposite to the first direction; and the buffer layer and the flexible display screen are alternately stacked and wound on the flexible screen scroll shaft.

5. The scroll type display device according to claim 4, wherein the buffer layer comprises a first buffer layer, a second buffer layer, and a magnetic shield layer sandwiched between the first buffer layer and the second buffer layer.

6. The scroll type display device according to claim 5, wherein the first buffer layer and the second buffer layer are buffer films.

7. The scroll type display device according to claim 4, wherein a surface of at least a part of the magnetic support structure facing away from the rear surface of the flexible display screen is provided with a spinous structure, and a surface of the buffer layer facing the rear surface of the flexible display screen is provided with a recessed structure meshed with the spinous structure.

8. A scroll type display device, comprising:
   a housing;
   a flexible screen scroll shaft; and
   a flexible display screen;
   wherein the housing is provided with an opening configured for extending and retracting the flexible display screen;
   the flexible screen scroll shaft is rotatably arranged in the housing, and the flexible screen scroll shaft is connected with the flexible display screen and configured for winding the flexible display screen; and
   a rear surface of the flexible display screen is provided with a plurality of magnetic support structures arranged in a longitudinal direction, and two adjacent magnetic support structures are mutually attracted;
   wherein the scroll type display device further comprises:
   a buffer layer;
   a buffer layer scroll shaft rotatably arranged in the housing and connected with an end of the buffer layer; wherein the buffer layer scroll shaft is arranged in parallel with the flexible screen scroll shaft, and the flexible screen scroll shaft is connected with the other end of the buffer layer; and
   when the buffer layer scroll shaft and the flexible screen scroll shaft are rotated in a first direction, the buffer layer is gradually wound on the buffer layer scroll shaft, and the flexible display screen is gradually extended; when the buffer layer scroll shaft and the flexible screen scroll shaft are rotated in a second direction, the buffer layer and a flexible display screen are gradually wound on the flexible screen scroll shaft, the second direction is opposite to the first direction; and the buffer layer and the flexible display screen are alternately stacked and wound on the flexible screen scroll shaft.

9. The scroll type display device according to claim 8, wherein the buffer layer comprises a first buffer layer, a second buffer layer, and a magnetic shield layer sandwiched between the first buffer layer and the second buffer layer.

10. The scroll type display device according to claim 9, wherein the first buffer layer and the second buffer layer are buffer films.

11. The scroll type display device according to claim 8, wherein a surface of at least a part of the magnetic support structure facing away from the rear surface of the flexible display screen is provided with a spinous structure, and a surface of the buffer layer facing the rear surface of the flexible display screen is provided with a recessed structure meshed with the spinous structure.

* * * * *